US007181251B2

(12) United States Patent
Stöhr et al.

(10) Patent No.: US 7,181,251 B2
(45) Date of Patent: Feb. 20, 2007

(54) MOBILE COMMUNICATION TERMINAL WITH MULTI ORIENTATION USER INTERFACE

(75) Inventors: Josef Stöhr, Langenau (DE); Thomas Franke, Ulm (DE)

(73) Assignee: Nokia Corporation, Espoo (FI)

( * ) Notice: Subject to any disclaimer, the term of this patent is extended or adjusted under 35 U.S.C. 154(b) by 181 days.

(21) Appl. No.: 10/690,934

(22) Filed: Oct. 22, 2003

(65) Prior Publication Data
US 2005/0090288 A1 Apr. 28, 2005

(51) Int. Cl.
*H01H 13/70* (2006.01)

(52) U.S. Cl. ................................ 455/566; 455/550.1

(58) Field of Classification Search ............... 455/566, 455/550.1; 379/368
See application file for complete search history.

(56) References Cited

U.S. PATENT DOCUMENTS

| 6,310,609 | B1* | 10/2001 | Morgenthaler | 345/170 |
|---|---|---|---|---|
| 6,334,063 | B1 | 12/2001 | Charlier et al. | 455/566 |
| 6,756,969 | B2* | 6/2004 | Nuovo et al. | 345/169 |
| 6,805,506 | B2* | 10/2004 | Bar-Yona | 400/485 |
| 6,816,577 | B2* | 11/2004 | Logan | 379/67.1 |
| 6,926,418 | B2* | 8/2005 | Osterg.ang.rd et al. | 362/24 |
| 2002/0033836 | A1* | 3/2002 | Smith | 345/649 |
| 2002/0177464 | A1* | 11/2002 | Swerup et al. | 455/550 |
| 2003/0073462 | A1 | 4/2003 | Zatloukal et al. | 455/558 |
| 2003/0130007 | A1 | 7/2003 | Engstrom | 455/550 |
| 2003/0197679 | A1* | 10/2003 | Ali et al. | 345/158 |
| 2004/0045204 | A1* | 3/2004 | Miano et al. | 40/638 |
| 2004/0217939 | A1* | 11/2004 | Levy et al. | 345/156 |

FOREIGN PATENT DOCUMENTS

| DE | 19855022 A1 | 5/2000 |
|---|---|---|
| DE | 29917986 U1 | 5/2000 |
| DE | 29900166 U1 | 6/2000 |
| GB | 2331204 | 5/1999 |
| WO | WO 98/01876 * | 6/1997 |
| WO | WO 00/03528 | 1/2000 |
| WO | WO 02/47365 | 6/2002 |
| WO | WO 02/061960 | 8/2002 |

OTHER PUBLICATIONS

PCT International Application No. PCT/EP03/00607—unpublished as of Oct. 22, 2003.

* cited by examiner

*Primary Examiner*—Lester G. Kincaid
*Assistant Examiner*—Muthuswamy G. Manoharan
(74) *Attorney, Agent, or Firm*—Perman & Green, LLP

(57) ABSTRACT

The invention relates to a mobile communication terminal comprising a user interface with a display and a keypad for supporting various functions. According to the invention, the orientation of the content of a hard label or a soft label of at least one of the keys can changed so that the key can be used with the terminal in different orientations. The content of the display may also be readable in different orientations by changing the display direction. The mobile terminal may be provided with an orientation sensor allowing automatic changing of the display direction of the soft labels and the rest of the display content. The labeling of the hard keys may be changeable by operating a handle or by mechanical arrangements or optical effects.

15 Claims, 18 Drawing Sheets

MOBILE COMMUNICATION TERMINAL WITH MULTI ORIENTATION USER INTERFACE

BACKGROUND OF THE INVENTION

1. Field of the Invention

The present invention relates to mobile communication terminals comprising a user interface with a display and a keypad for supporting various functions and in particular facilitating user interaction with different functionalities associated with mobile communication terminals.

2. Brief Description of Related Developments

Mobile communication terminals such as mobile phones or personal digital assistants (PDA) generally have a layout with a front surface provided with a screen in the upper part and a keypad there below. As mobile communication terminals have become increasingly complex, a great number of additional features have been included, giving users an increased number of ways to use their mobile communication terminal. For some of these functions, the traditional layout described earlier is appropriate, but for another group of functions a different layout would be preferable. Prior art terminals have however not provided a terminal with a more flexible layout, though several attempts have been made to allow these terminals to be used in different orientations:

U.S. 2003/0073462 discloses a mobile terminal in which the orientation of the information on the display can be changed, so that the terminal can be used in an upright position and in a horizontal position. The keys of the keypad are however not labeled so that the user has to memorize the function(s) of the individual keys. Memorizing the functions of all the keys causes a steep learning curve, and in turn to a reduced user acceptance of this type of terminal.

WO 02/47365 discloses a mobile communication terminal with a user interface that can be used in a layout with a front surface provided with a screen in the upper part and a keypad there below. The orientation of the information shown on the display can be changed. The keypad as a whole is arranged on a disk that is rotatable relative to the housing of the mobile terminal with wire leads running through the central pivot point connecting the disk to the housing. The terminal can thus be used in different orientations, e.g. upside down with the keypad above the display. The rotatable keypad arrangement is however mechanically complicated and sensitive. Problems with twisting leads have also been observed. This is undesirable since mobile terminals need to be rugged and robust to endure the influences that they are exposed to during mobile use.

Thus, none of the prior art solutions have been quite satisfactory, since either the labels were absent, or the readability of the labels of the keys was difficult when the device is not used in its standard orientation or the means for changing the label orientation were sensitive mechanisms with complex mechanical and/or electromechanical features.

SUMMARY OF THE INVENTION

On this background, it is an object of the present invention to provide a mobile communication terminal of the kind referred to initially, with a flexible, robust and user friendly user interface.

This object is achieved in accordance with claim 1 by providing a mobile communication terminal having a user interface comprising a display for showing information and a keypad including at least one softkey. The function of the softkey is controlled by a controller unit and displayed as a soft label in a predetermined area of said display. The terminal is further provided with means for instructing the controller unit to change the orientation of the soft label.

When using the mobile terminal an orientation other than the standard orientation the readability of the labels is a problem (unless the user is trained to read tests upside down or sideways). This is particularly true for the softkeys since their function can due to their changing nature and contrary to e.g. the alphanumerical hard keys not be memorized. By allowing the orientation of the label in the predetermined area to the changed a better user interface is obtained when the terminal is not in the standard orientation. The orientation of the soft label is changed without changing the position of the predetermined area relative to the at least one softkey so that the any physical proximity there between is maintained.

The controller unit may change the orientation of the soft label in response to a state change of the terminal or a upon a user entered command.

Alternatively, an orientation sensor in the terminal or a manually activated switch can be used to prompt the controller unit to change the orientation of the soft label.

The same orientation changes can be applied to information on the display as to the soft label. Because the soft label should not change place, the layout of the display will change.

The above object is also achieved by a mobile communication terminal having a user interface comprising a display for showing information and a keypad including at least one hard key with a hard label that can be read in at least two different orientations. The present function of the at least one hard key is controlled by a controller unit in dependence of the orientation of the terminal. Means are provided for informing the controller unit of the orientation of the terminal.

The orientation of the information on the display is preferably changed in accordance with the orientation of the terminal.

The combination of a multidirectionally labeled key and a display that can adapt the orientation of the information shown thereon allow the terminal to be used in different orientations.

The above object is also achieved by a mobile communication terminal having a user interface comprising a display for showing information and a keypad including a plurality of hard keys. The labels of the hard keys include textual and or graphical content relating to the function of the hard key concerned. The label of least one of the hard keys is formed by a hologram on which the textual and/or graphical content can be read in at least two different orientations.

Preferably, the information on the display can be shown in the different orientations in which the hologram label can be read.

The above object is also achieved by a mobile communication terminal having a user interface comprising a display for showing information and a keypad including a plurality of hard keys. The labels of the hard keys include textual and or graphical content relating to the function of the hard key concerned. At least one of the hard keys is formed by an at least partially transparent key body that allows objects under the key to be seen through the top of the key. At a substrate that can move relative to the key is provided with at least two labels. The labels include textual and/or graphical content that can preferably be read in different ordinations. The substrate can be moved relative to the hard key to allow a different one of the at least two labels to be visible through the key.

The different labels can associated with different functions of the key concerned or to different orientations in which the label can be read. Accordingly, a user can slide the substrate to a position in which the desired labels areas are visible.

The substrate may extend under a plurality of keys, so that a group of labels belonging to a plurality of keys can be moved simultaneously. Accordingly, it is possible to have a coherent group of functions for a set of keys visible in one position of the substrate, and another group of functions visible in another position of the substrate.

In one embodiment the labels are arranged on a substrate that can slide linearly, in another embodiment slidable the substrate is rotably arranged.

The above object is also achieved by a mobile communication terminal having a user interface comprising a display and a keypad including at with a plurality of hard keys. The labels of the hard keys include textual and or graphical content relating to the function of the hard key concerned. At least one of the hard keys comprises a lenticular screen with at least two interlaced labels there behind. Each of the at least two labels being visible from a different viewpoint and preferably being readable in a different orientation.

Accordingly, different labels becomes visible from different viewpoints e.g. one label area is visible in the standard orientation and another label area is visible in the upside down orientation.

Preferably, the orientation of the information on the display can be changed to be readable in different orientations of the terminal. A set of keys may be provided with labels of which different areas are visible from different viewpoints.

Accordingly, a group of coherent functions for the set of keys is visible form one viewpoint and another group of coherent functions is visible from another viewpoint.

The above object is also obtained by a mobile communication terminal having a user interface comprising a display and a keypad including a plurality of hard keys. The labels of the hard keys include textual and or graphical content relating to the function of the hard key concerned. At least one of the hard keys is formed by an at least partially transparent key body that allows objects under the key to be seen through the top of the key. A label is arranged under the key on a pair of polarized films that can be moved relative to one another. The textual and/or graphical content of the label can be read in at least two different orientations in dependence of the relative orientation of the polarized films to one another.

Accordingly, the label orientation can be changed. Preferably, a handle or other arrangement is provided to rotate the one film relative to the other.

The above object is also obtained by a mobile communication terminal having a user interface comprising a display and a keypad including a plurality of hard keys arranged in a substantially circular pattern. The labels of the hard keys include textual and or graphical content relating to the function of the hard key concerned. The hard keys are formed by an at least partially transparent key body that allows objects under the key to be seen through the top of the key. The labels of the hard keys being arranged on a rotatable substrate in a substantial circular pattern that matches the circular pattern in which the hard keys are arranged. Preferably, the labels are arranged on the substrate in different groups. Each group being visible through the plurality of keys in a given position of the substrate. The label may be attached to a handle or other mechanism for rotating the substrate, possible in small angular steps.

Accordingly, the user can rotate the substrate until the desired label group is visible. The label groups can relate to different functions and/or different orientations in which the labels can be read The above object is also obtained by a mobile communication terminal having a user interface comprising display, a confirming key and a rejection key. A function to be confirmed or to be rejected is controlled by a controller unit and displayed in a predetermined area of the display. The terminal also comprises means for instructing the controller unit to change the orientation in which the function is displayed. Accordingly, the confirmation key and the rejection key can be used with the terminal in different orientations, whilst the function to be confirmed or rejected is comfortably readable by a user. The terminal can be provided with an orientation sensor that delivers a signal to the controller unit for automatically selecting the appropriate orientation for the function shown in the display. Accordingly, the user can simply turn the terminal in a desired orientation of use and continue using the confirmation and rejection keys without having any problems in reading the associated function in the display.

The controller unit changes the orientation of the function to be confirmed or to be rejected preferably without changing the position of the predetermined area relative to the confirming key and rejection key.

The controller unit may also change the orientation of the function to be confirmed or to be rejected in response to a state change of the terminal or a upon user entered command.

Further objects, features, advantages and properties of the mobile communication terminal according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION OF THE PREFERRED EMBODIMENT(S)

Figure 1:
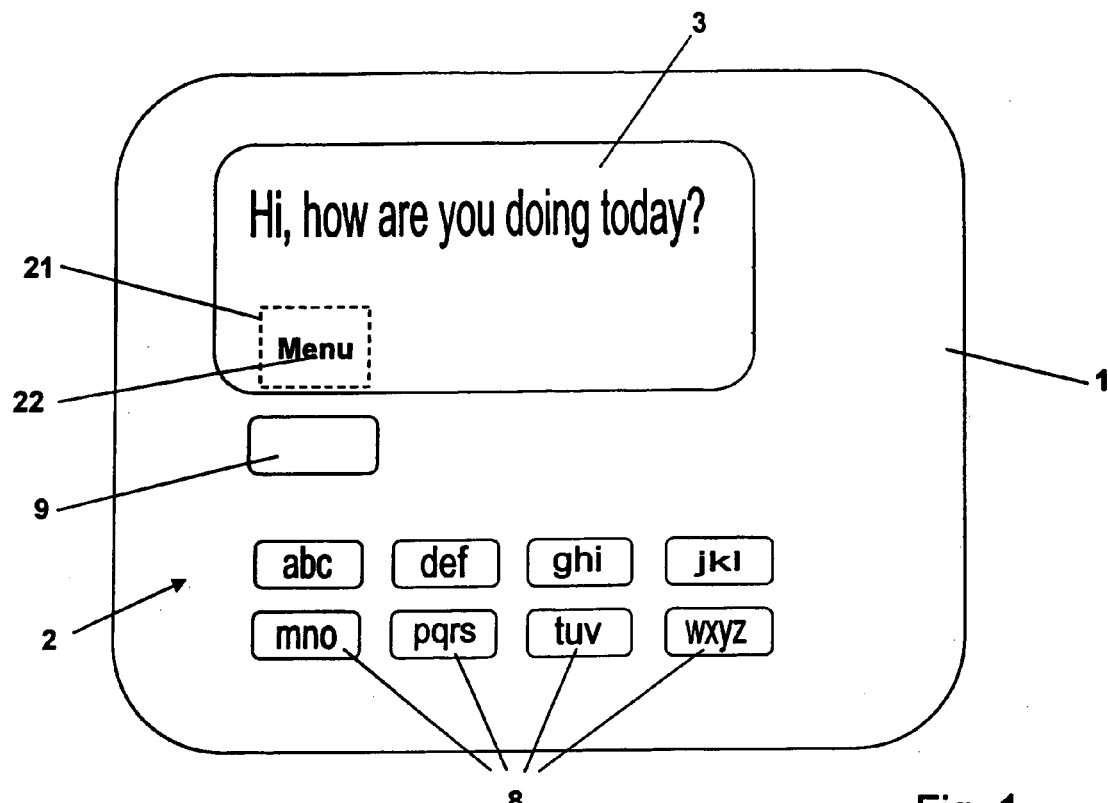
FIG. 1 illustrates a first embodiment of a mobile communication terminal, for use with the present invention in a standard orientation.

The various features of the invention will now be described with respect to the figures, in which like parts are identified with the same reference numerals.

FIG. 1 shows a first preferred embodiment the mobile communication terminal 1 according to the invention in the form of a pager. The pager 1 comprises a user interface having a keypad 2 and a display 3. The keypad has a group of alpha keys 8 for entering texts and a softkey 9. The present function of the softkey 9 is shown as text 22 (softkey-label) in a separate field 21 in the display 3 just above the softkey 9. The softkey 9 is a multifunctional key and its present function depends on the state of the pager 1. The softkey 9 give access to the menu and functions relating to message handling.

Figure 2:
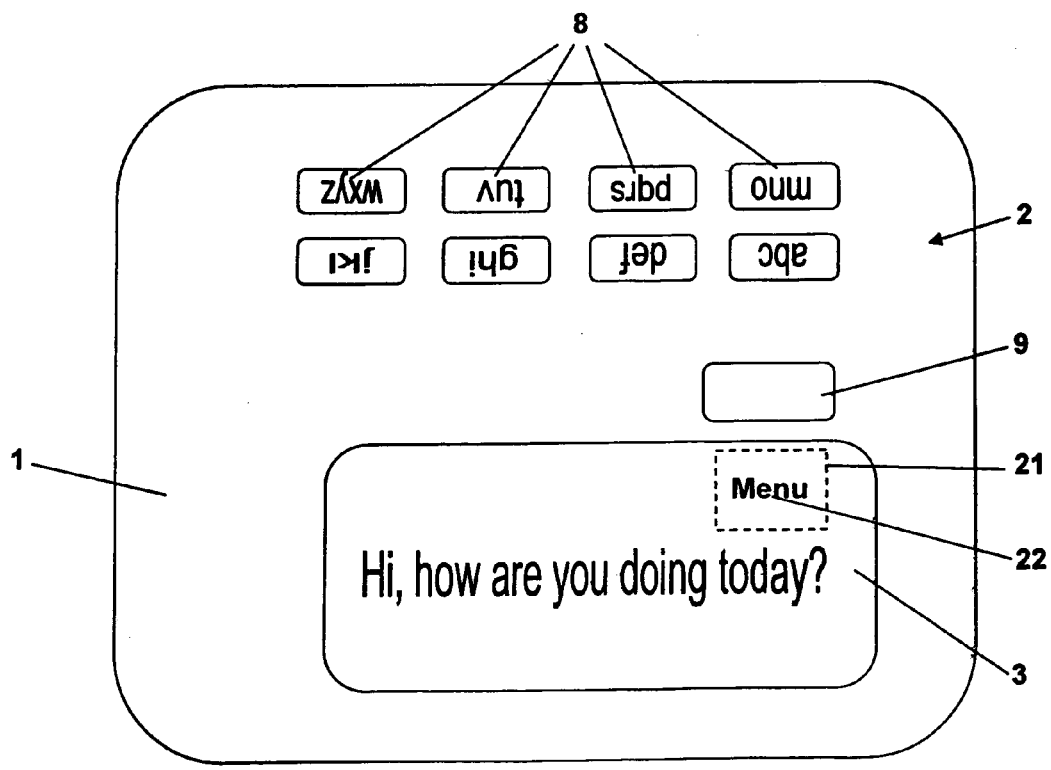
FIG. 2 illustrates the terminal of FIG. 1 in an upside down orientation.
Figure 3:
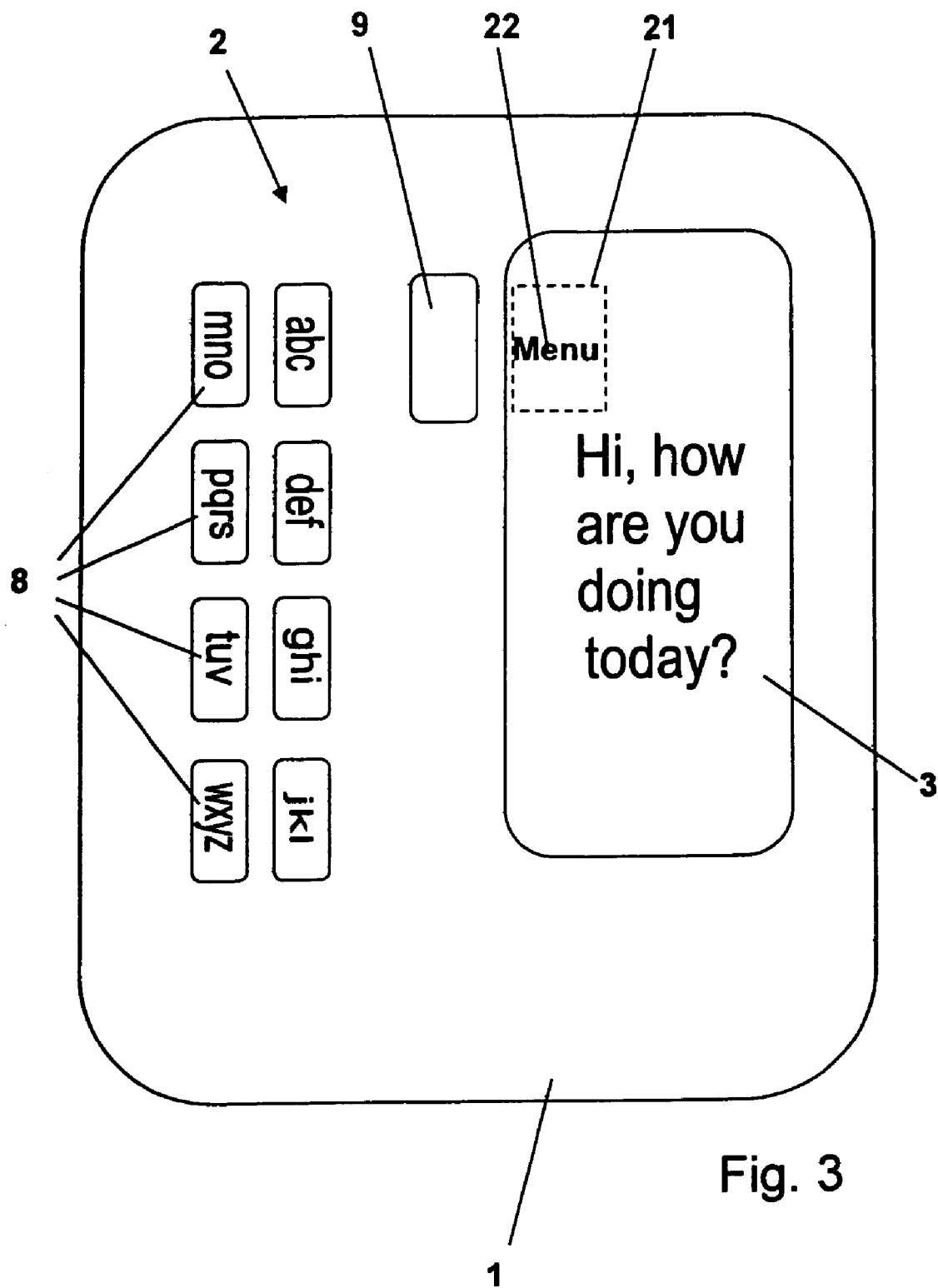
FIG. 3 illustrates the terminal of FIG. 1 in a sideways orientation.

The pager is provided with an orientation sensor (not shown) that informs a processor unit (not shown) of the present orientation of the pager. When the signal from the orientation sensor indicates that the pager is in an upside down orientation as illustrated in FIG. 2 the processor unit changes the orientation of the text 22 in field 21 accordingly. The processor unit changes the orientation of the text in the separate field 21 without changing the location of the separate field 21. The separate field 21 stays therefore proximate to the softkey 9. The processor unit may also change the orientation of the other information that is shown on the display 3. FIG. 3 illustrates the pager in a sideways orientation.

Figure 4:
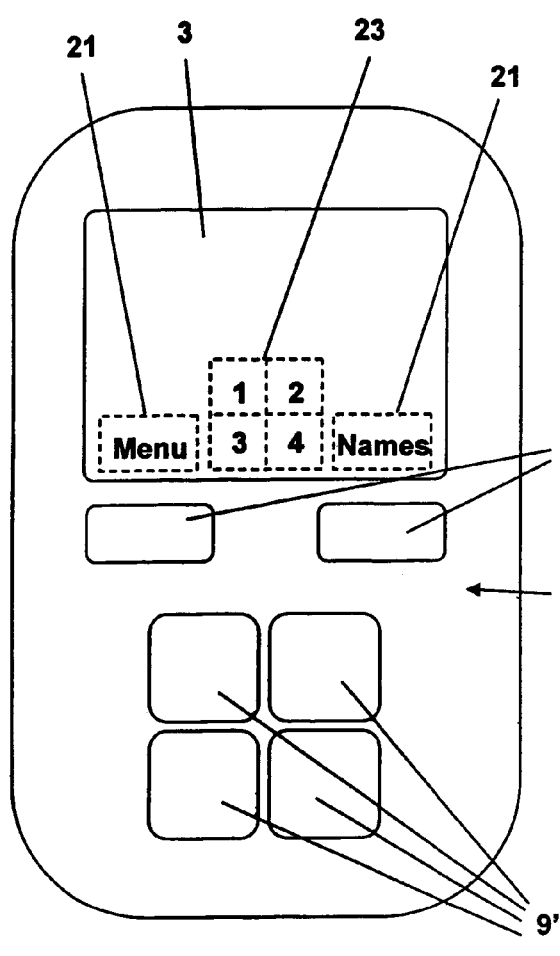
FIG. 4 illustrates a second embodiment of a mobile communication terminal for use with the present invention in a standard orientation.

FIG. 4 shows a second preferred embodiment the mobile communication terminal 1 according to the invention in the form of a PDA. The PDA comprises a user interface having a keypad 2 and a display 3. The keypad has a group of softkeys 9' for entering texts and number and two softkeys for menu access and for selection of menu items. The present function of the softkeys 9,9' is shown as text in a separate fields 21 and 23 in the display 3. The softkeys 9,9' are multifunctional keys and their present function depends on the state of the PDA, e.g. in a text editing mode the keys will have alpha functions, in a numerical mode the softkeys 9 will have numerical functions.

Figure 5:
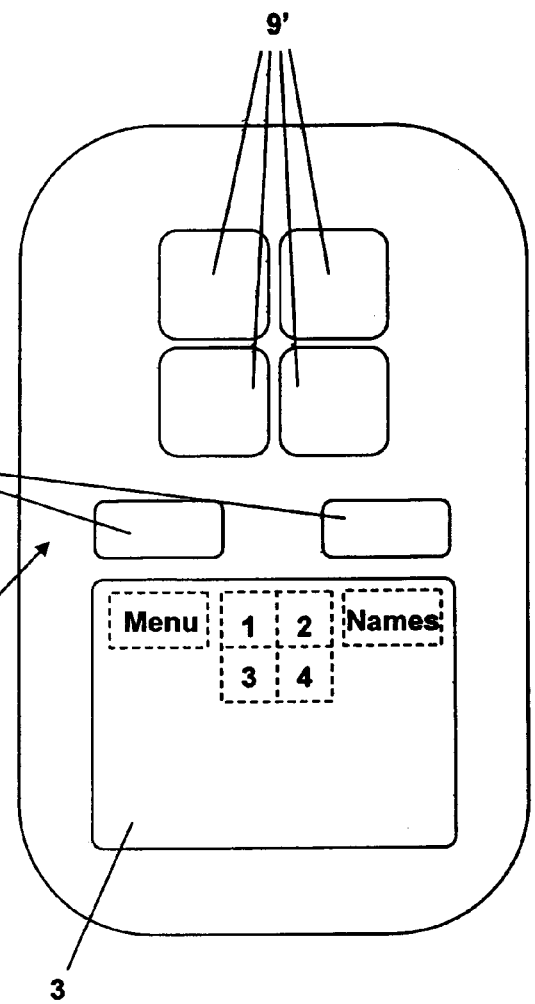
FIG. 5 illustrates the terminal of FIG. 4 in an upside down orientation.

The PDA is provided with an orientation sensor (not shown) that informs a processor unit (not shown) of the present orientation of the pager. When the signal from the orientation sensor indicates that the pager is in an upside down orientation as illustrated in FIG. 5 the processor unit changes the orientation of the text in fields 21,23 accordingly. The processor unit changes the orientation of the text in the separate fields 21,23 without changing the location of the separate fields 21,23. The processor unit may—as shown—also change the orientation of the other information that is shown on the display 3, however without changing the location of the separate fields 21,23.

Figure 6:
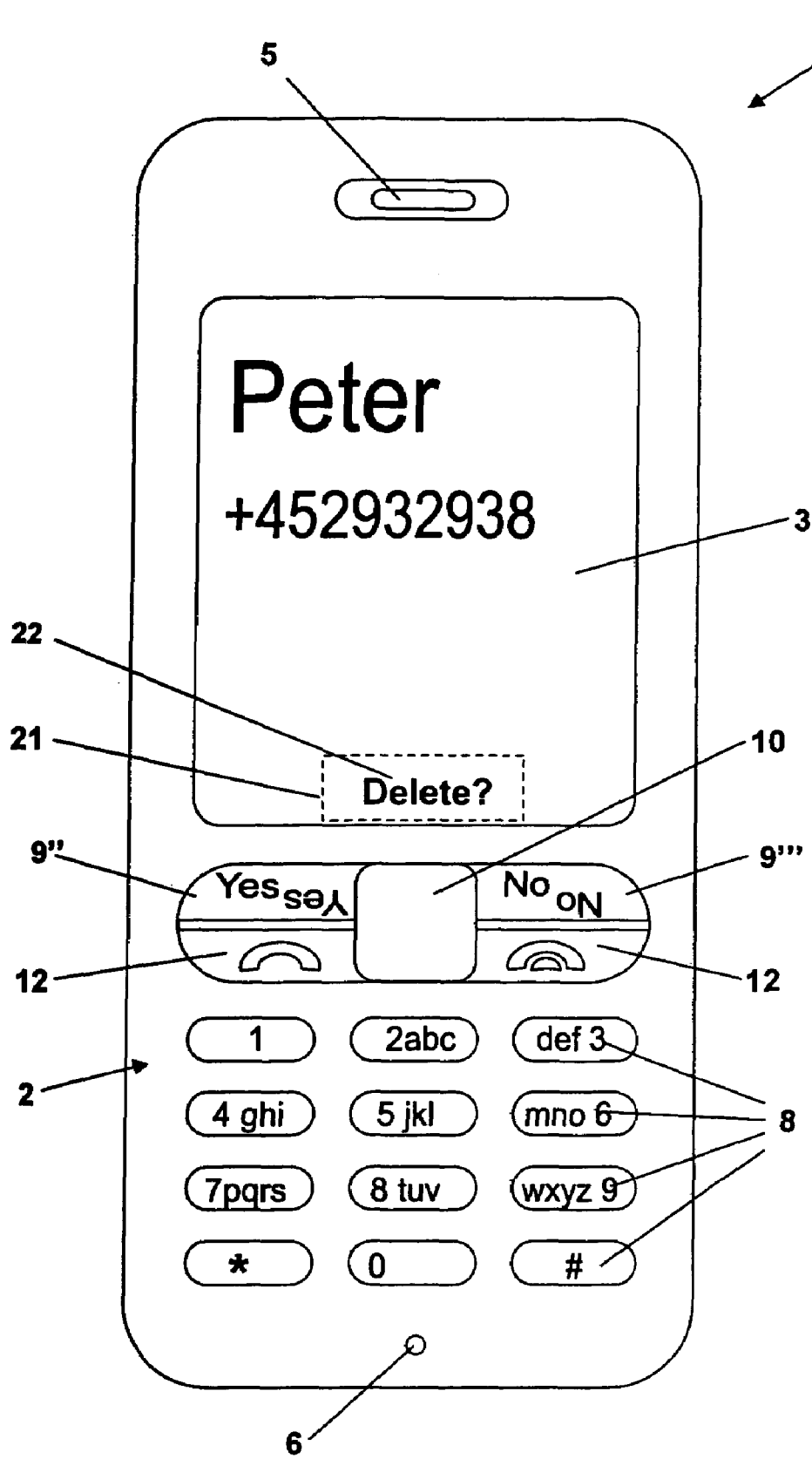
FIG. 6 illustrates a third embodiment of the present invention in a standard orientation.

FIG. 6 illustrates a third embodiment the mobile communication terminal 1 according to the invention in the form of a mobile phone. The mobile phone, shown in the standard upright orientation, comprises a user interface having a keypad 2, a display 3, an on/off button (not visible, present in the top of the phone) a speaker 5, and a microphone 6 (only the opening present in the bottom of the phone is visible). The mobile phone 1 according to the preferred embodiment is adapted for communication via a cellular network, such as the GSM 900/1800 MHz network, but could just as well be adapted for use with a Code Division Multiple Access (CDMA) network or the G3 network.

According to a preferred embodiment, the keypad 2 has a first group 8 of keys as alphanumeric keys, a confirm key 9" and a reject key 9'", a cursor navigation key 10 (scroll up/down/left/right), and on-hook and off-hook keys 12. The present function to be confirmed or rejected is shown as text 22 (the function can alternatively also be shown graphically in the form of e.g. an icon) in separate field 21 in the middle of the lower part of the display 3 near the rejection key 9'" and confirming key 9'". The present function to be rejected or confirmed depends on the state of the mobile phone, and the previously selected or rejected functions. The removal of an entry from the phonebook is illustrated in FIG. 6 by way of example.

Figure 7:
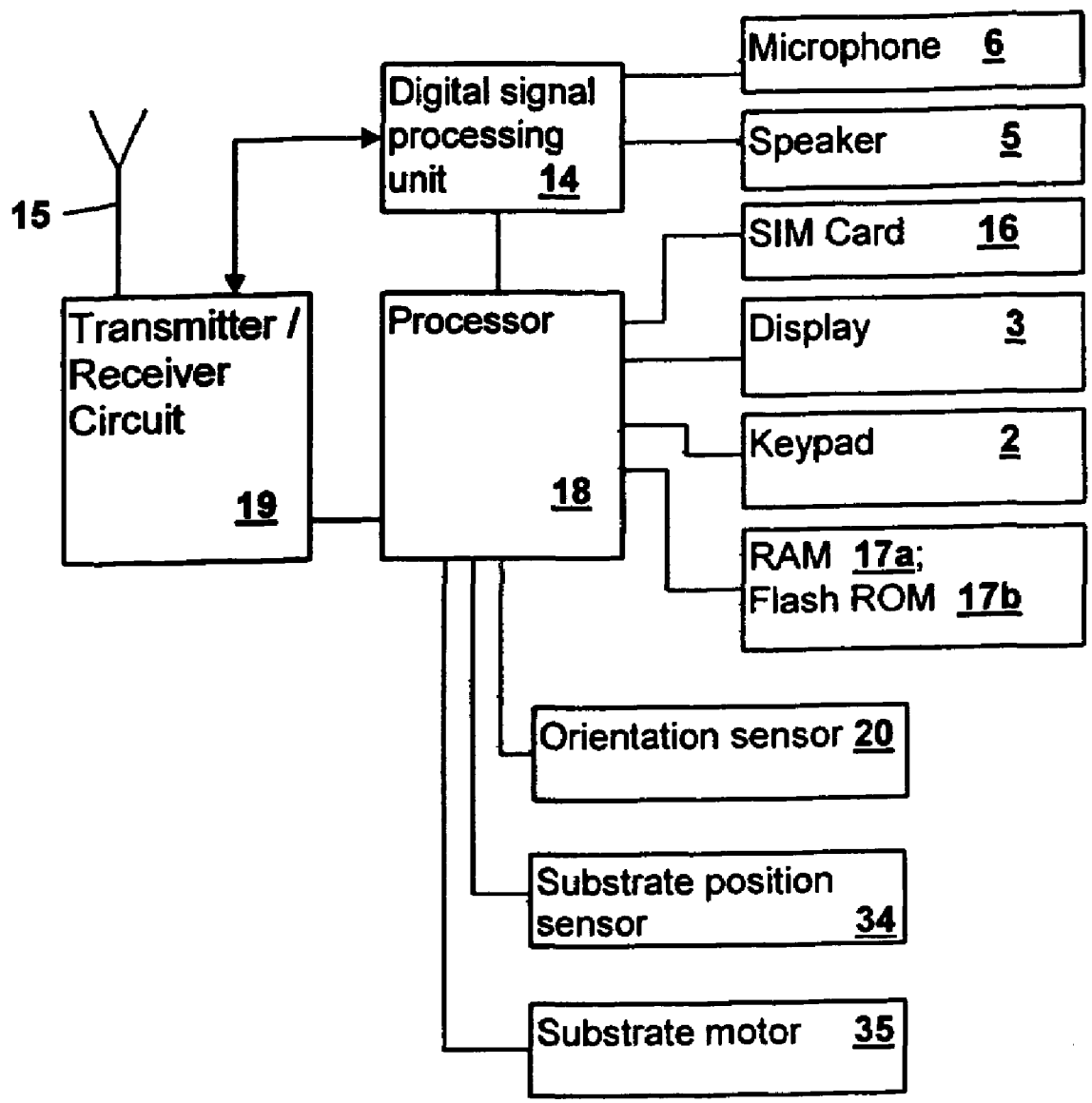
FIG. 7 is a block diagram illustrating the general architecture of the mobile terminal of FIG. 6.

FIG. 7 illustrates in block diagram form the general architecture of the mobile phone constructed in accordance with the present invention. The mobile phone includes a microprocessor 18 for controlling the operation of the mobile phone, a program memory (flash ROM 17b) for storing programs used by the mobile telephone and a random access memory (RAM 17a). Input/output circuits interface the microprocessor 18 with a keypad 2, a display 3, digital signal processing unit 14, and the receiver/transmitter circuit 19. The receiver/transmitter circuit 19 is connected to an internal antenna 15. The digital signal processing circuit 14 provides analog audio outputs to the speaker 5 and accepts analog audio inputs from the microphone 6. The processor 18 also forms the interface to the peripheral units of the apparatus, including an orientation sensor 20 and a SIM card 16, as well as data, power supply, etc.

The mobile phone comprises a tilt sensor 20 which determines the direction and magnitude of the rotational displacement relative to vertical using the planetary gravitational field. The sensor preferably measures the rotational changes about two orthogonal axes. The construction of the sensor 20 is not shown but can be of any of well known types such as those operating with accelerometers (taking the gravitational force into accounts when determining acceleration), with encoding disks on a freely rotatable shaft connected to a weight, or of the type that uses sphere provided with an asymmetrical weight that floats in a liquid.

Alternatively the tilt sensor 20 could be of the gyroscopic type. Preferably, the sensor is of a miniaturized type, e.g. by using Micro-Electro-Mechanical Systems (MEMS) technology (the integration of mechanical elements, sensors, actuators, and electronics on a common silicon substrate through micro-fabrication technology). If the mobile phone is provided with a digital camera the signal from the camera can be used to support the signal from an absolute type angular sensor, as described in e.g. PCT application PCT/EP 03/00607, hereby incorporated by reference.

Figure 8:
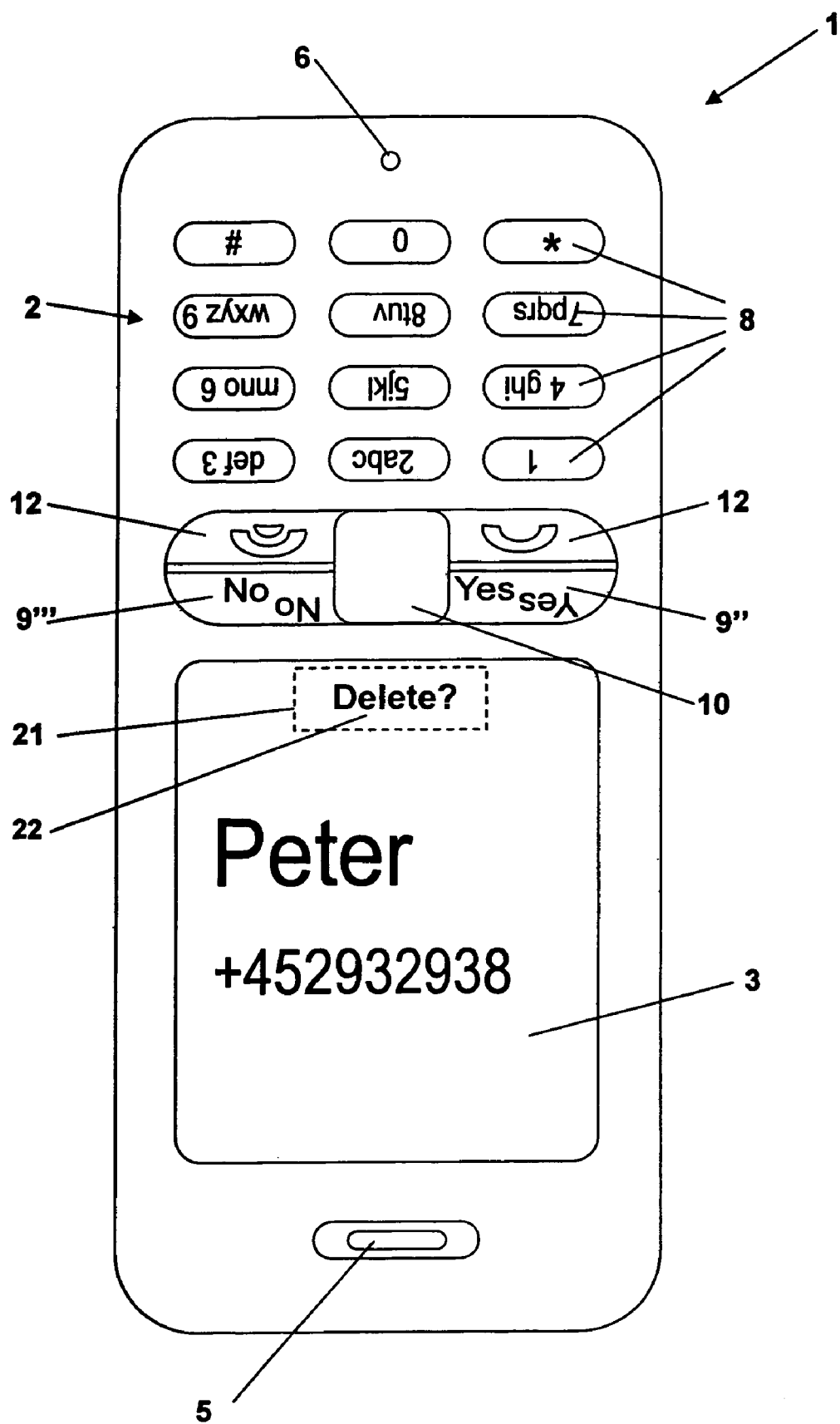
FIG. 8 illustrates the mobile terminal of FIG. 6 in an upside down orientation.

The signal of the tilt sensor 20 is sent to the processor unit 18. The processor unit 18 analyzes the signal from the tilt sensor 20 and determines the orientation of the mobile phone. The function to be selected or rejected can be displayed in four discrete orientations: normal, upside down, 90° clockwise and 90° anti-clockwise. The user will not normally hold the mobile phone perfectly upright, upside down, etc. The processor unit 18 selects therefore the display orientation that best matches the measured orientation of the phone. FIG. 8 illustrates the mobile phone in and upside down orientation with the function to be selected perfectly readable to the user. In FIG. 8 the display direction of the content of the main area of the display has been reversed.

The processor unit is preferably programmed to ignore quick changes in measured orientation in order to avoid inadvertent quick repetitive changes in the display origination of the function to be selected or rejected. The function to the selected or rejected can thus always be easily read by a user in any orientation of the mobile phone.

The user may switch off the orientation sensor 20 and control the orientation direction of the function to be selected or rejected via the user interface. This can be advantageous when e.g. traveling in an airplane or train, where the accelerative forces of the moving vehicle could disturb proper operation of the tilt sensor.

The user may also instruct the processor through the user interface to apply a 90° offset to the signal from the orientation sensor to compensate for the users present position. Thus, the orientation of the information in the display is also comfortably readable for a user who is using the terminal while laying on the side.

Figure 9:
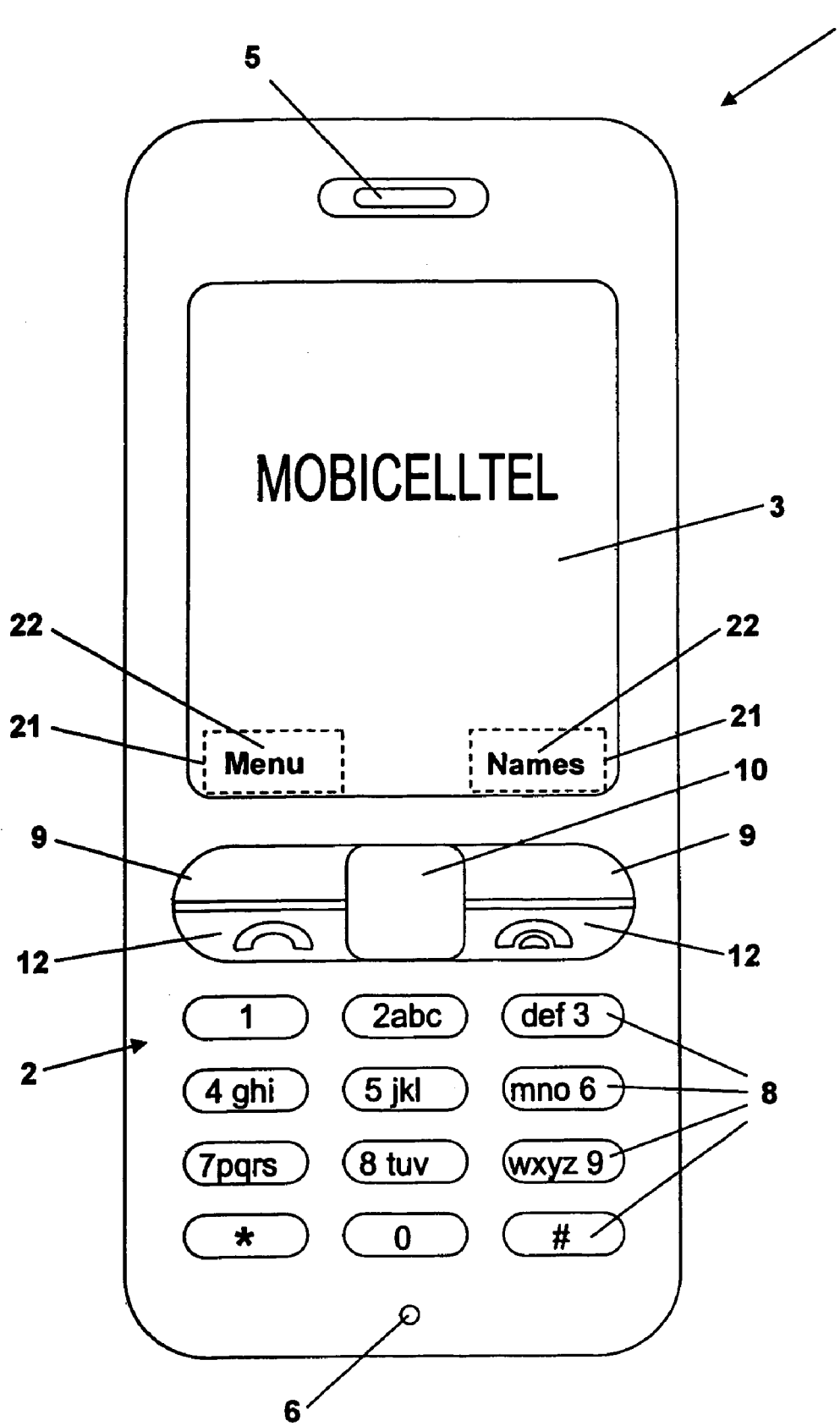
FIG. 9 illustrates a fourth embodiment of the present invention in a first orientation.

FIG. 9 illustrates a fourth preferred embodiment of the mobile communication terminal 1 according to the invention in the form of a mobile phone. The mobile phone, shown in the standard upright orientation, is similar to previously described mobile phone, however the keypad 2 has a first group 8 of keys as alphanumeric keys, two softkeys 9, a cursor navigation key 10 (scroll up/down), and on-hook and off-hook keys 12. The present functionality of the softkeys 9 is shown as text 22 in separate fields 21 (softkey-labels) in the display 3 just above the softkeys 9. The softkeys 9 are multifunction keys and their present function depends on the state of the mobile phone 1. The softkeys 9 give access to the menu, the phonebook and can activate actions related to call handling and message handling.

Figure 10:
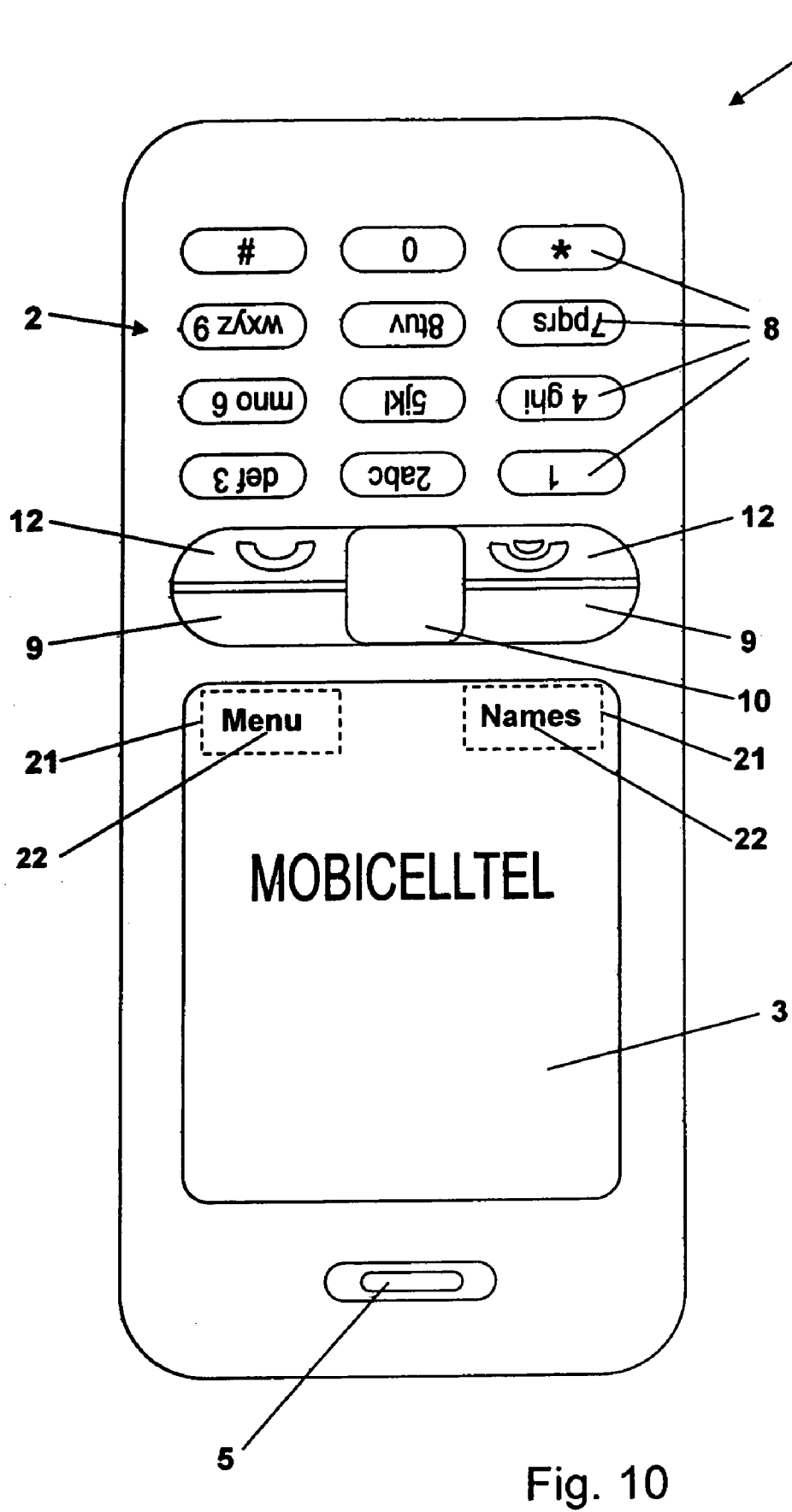
FIG. 10 illustrates the mobile terminal of FIG. 9 in an upside down orientation.

The mobile phone comprises the same tilt sensor 20 as in the previous embodiment. The processor unit changes the orientation of the softkey labels to match the presently detected orientation of the phone. FIG. 10 illustrates the mobile phone in and upside down orientation with the softkey labels perfectly readable to the user. The processor may—as shown—also change the orientation of the information displayed in the main area of the display 3 (in this case the phone is in the idle mode and the operator logo is displayed). The position of the separate fields 21 is though not changed so that they remain proximate to the softkeys 9.

Figure 11:
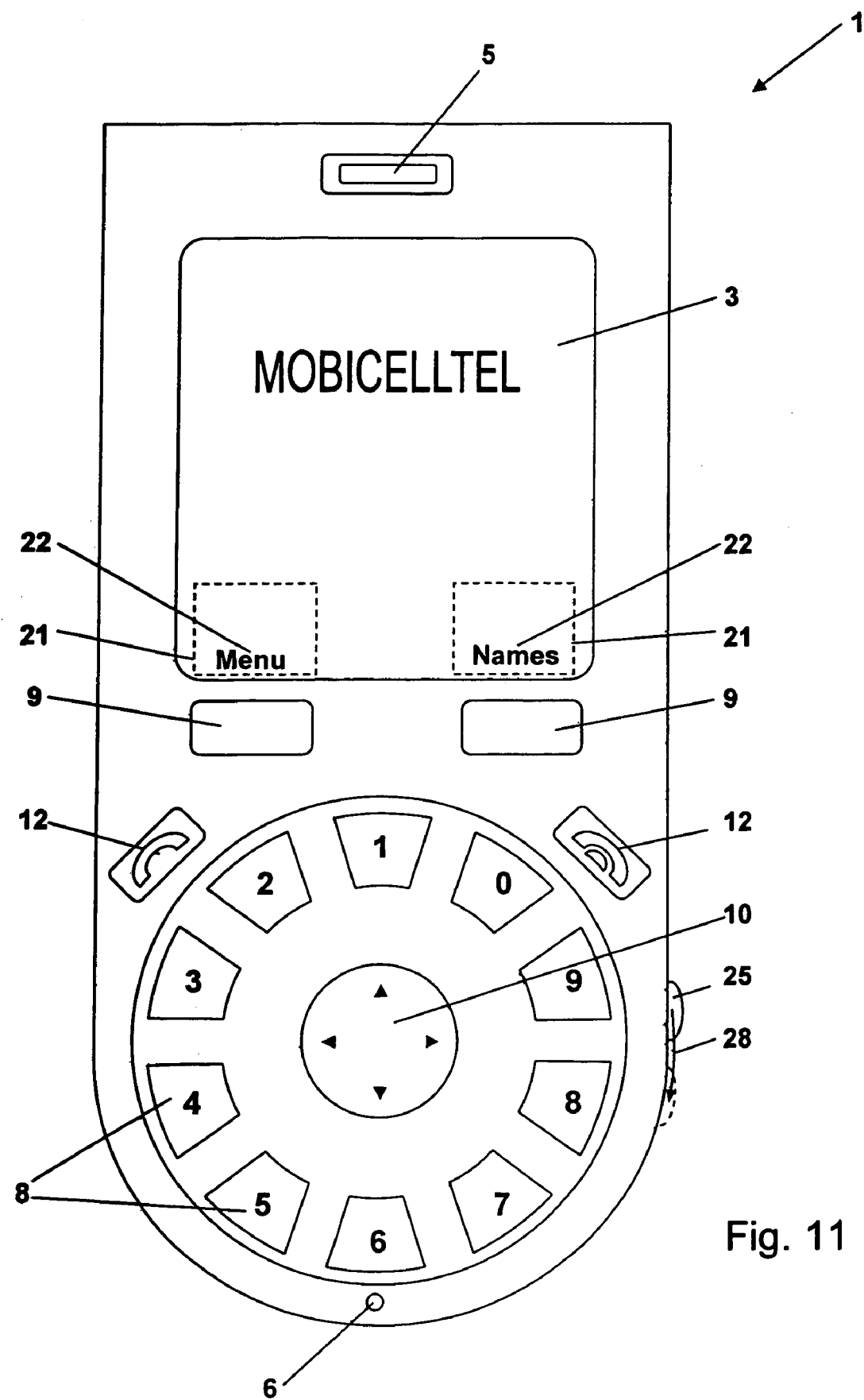
FIG. 11 illustrates a fifth embodiment of the present invention in a first orientation.

FIG. 11 illustrates a fourth preferred embodiment the mobile communication terminal 1 according to the invention in the form of a mobile phone. The mobile phone, shown in the standard upright orientation, is similar to previously described mobile phone, however the first group 8 of keys as numeric keys, is arranged in a circular pattern.

Figure 12:
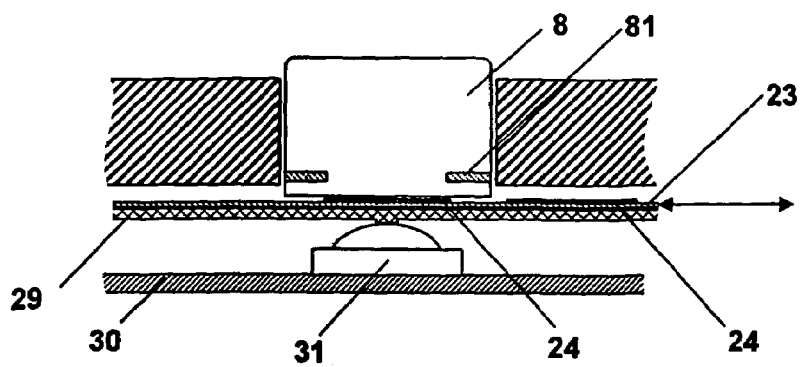
FIG. 12 illustrates in detail a first arrangement to change visible label sections.

With reference to FIG. 12, the keys 8 are made of a transparent material and can be provided with view limiting blinds 81. Labels 24 are arranged on a rotary disk 23 there below. The disk 23 is formed by a film on which the labels 24 are printed. The labels are arranged in a circular pattern that matches the pattern of the keys 8. The rotary disk is provided with at least two sets of labels, each set being visible in a different angular position of the disk 23. The disk can be rotated clockwise in a stepped manner by operating a lever 25 in the direction of arrow 28. A mechanism (not shown) translates the movement of the lever 25 into a rotary step of the disk 23. A flexible intermediate layer 29 is arranged below the rotary disk 23. Dome switches 31 mounted on a PCB 30 below the keys 8 are actuated through the film 23 and the flexible intermediate layer 29.

Figure 13:
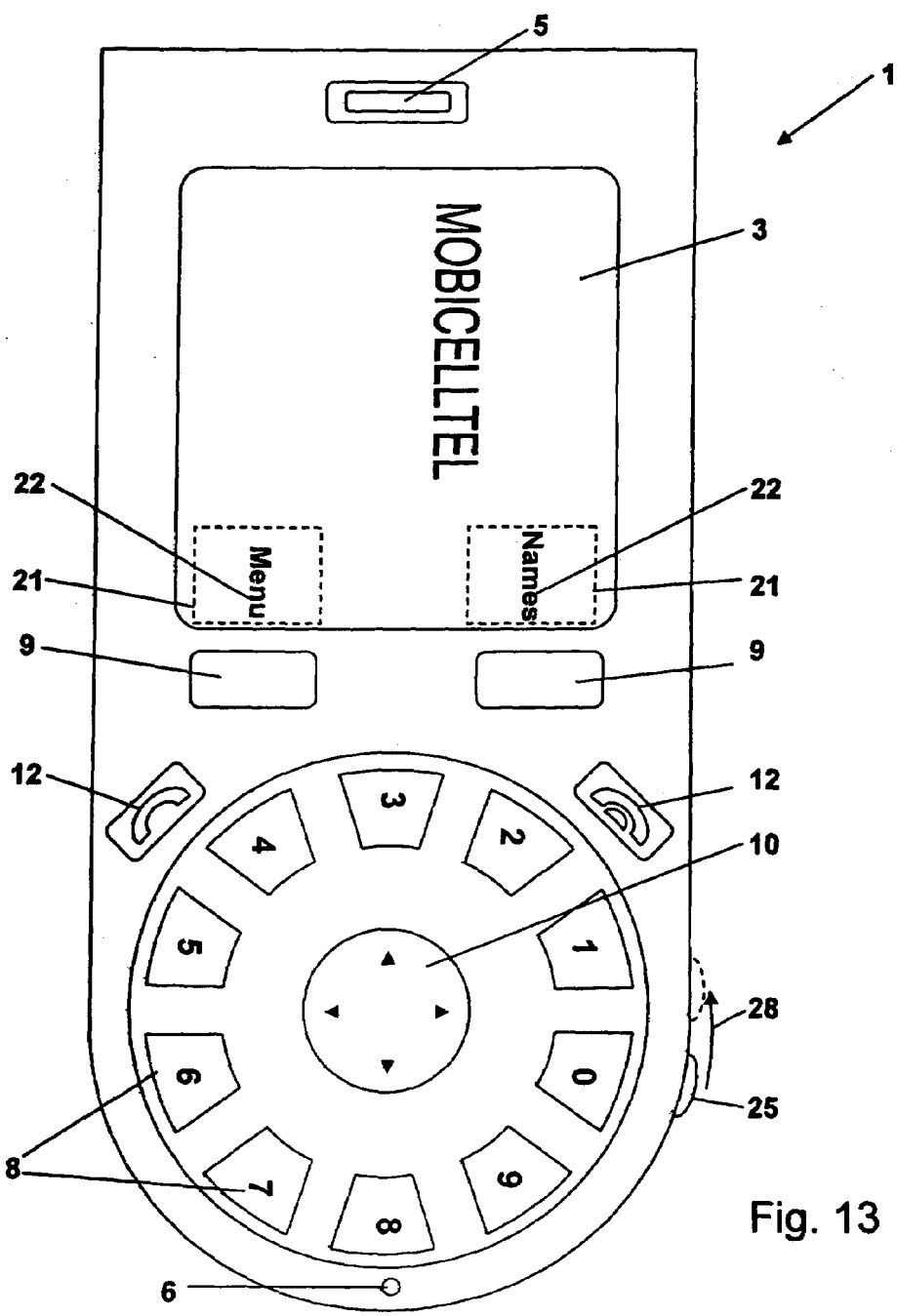
FIG. 13 illustrates the mobile terminal of FIG. 11 in a sideways orientation.

The mobile phone comprises the same tilt sensor 20 as in the previous embodiments. The processor unit changes the orientation of the softkey labels to match the presently detected orientation of the phone. FIG. 13 illustrates the mobile phone in and sideways orientation with the softkey labels and the labels 24 of the numeric keys perfectly readable to the user. The disk 23 shows now a set of labels wherein the numbers can be read in the sideways orientation of the phone. The processor may—as shown—also change the orientation of the information displayed in the main area of the display 3. The position of the separate fields 21 is though not changed so that they remain proximate to the softkeys 9.

The disk 23 may be provided with more than two label sets. The different label sets may relate to a different functionality of the keys, or to a different orientation of the label content. Accordingly, a switch may be connected to the rotary disk to inform the processor unit 18 of the present position of the rotary disk 23, to adapt the functionality of the respective keys 8 to the visible label set. In a phone with user exchangeable covers—as well known in the art—the rotary disk 23 may also be user exchangeable to allow for further label sets to be employed with the phone. Hereto, the disks 23 are provided with a tag (not shown) that is recognized by the phone, so that the processor can be informed of the type of label sets that are present on the disk 23 that is in use. The tag could be magnetic, a transponder chip, or any other conventional identification means suitable for use inside a mobile communication terminal.

A sensor 34 (FIG. 7) determines the present position of the rotary disk 23. The sensor 34 interfaces with the processor unit 18 which in term determines the correct functionality for the key/dome switch associated with the presently shown key label.

Behind the rotary disk 23 another user exchangeable film with a background image may be provided (not shown). This user exchangeable film could be used to change the background color for the key labels or to provide a background image.

In another embodiment the rotary disk 23 is not provided with a handle 25 but is motor driven instead. A substrate motor 35 (FIG. 7) controlled by the processor unit 18 moves the rotary disk 23 automatically to the desired position. The automatic repositioning of the rotary disc 23 may be triggered by a user command, a state change event of the phone, or in response to a change in orientation detected by the orientation sensor 20.

Figure 14:
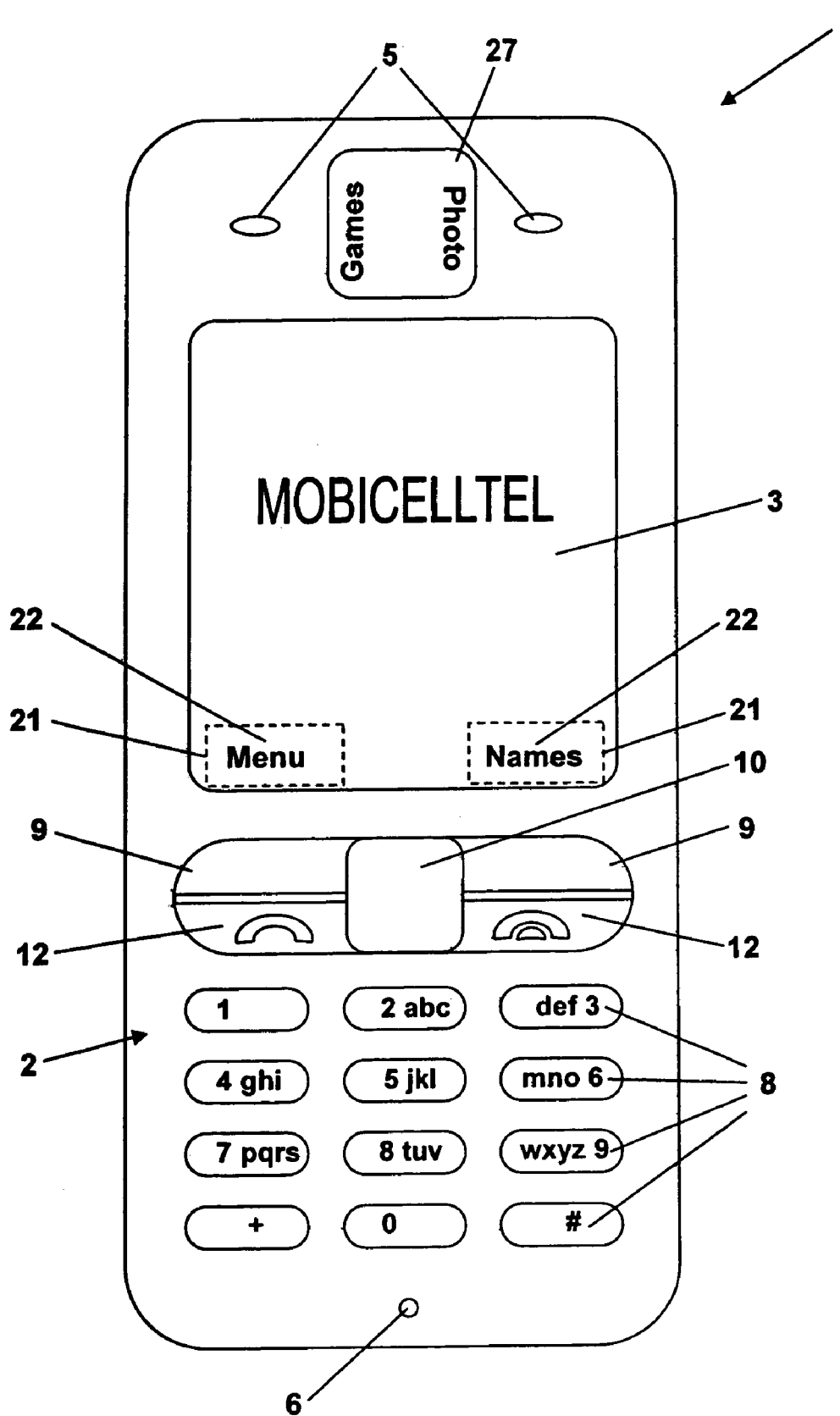
FIG. 14 illustrates a sixth embodiment of the present invention.

FIG. 14 illustrates a fifth preferred embodiment the mobile communication terminal 1 according to the invention in the form of a mobile phone. The mobile phone, shown in the standard upright orientation, is similar to mobile phone described with reference to FIGS. 9 and 10, however, a multifunctional key 27 is provided above the display 3. The key 27 could however be arranged in any other suitable place in the user interface. The multifunctional key 27 is provided with two hard labels printed thereon. The two hard labels relate to two different functions and can be read in two different orientations. In this example, one function is the activation of a camera not shown) to use the phone as a photo or video camera, the other function is the activation of games. For capturing images, the phone is held sideways with the key 27 on the left and the keys 8 on the right, thus rendering the phone more photo camera like. The phone is held sideways with the key 27 on the right and the keys 8 on the left in gaming applications, allowing for easier access of the keys on the right and left side of the display during gaming, thus rendering the phone more suitable for gaming.

Figure 15:
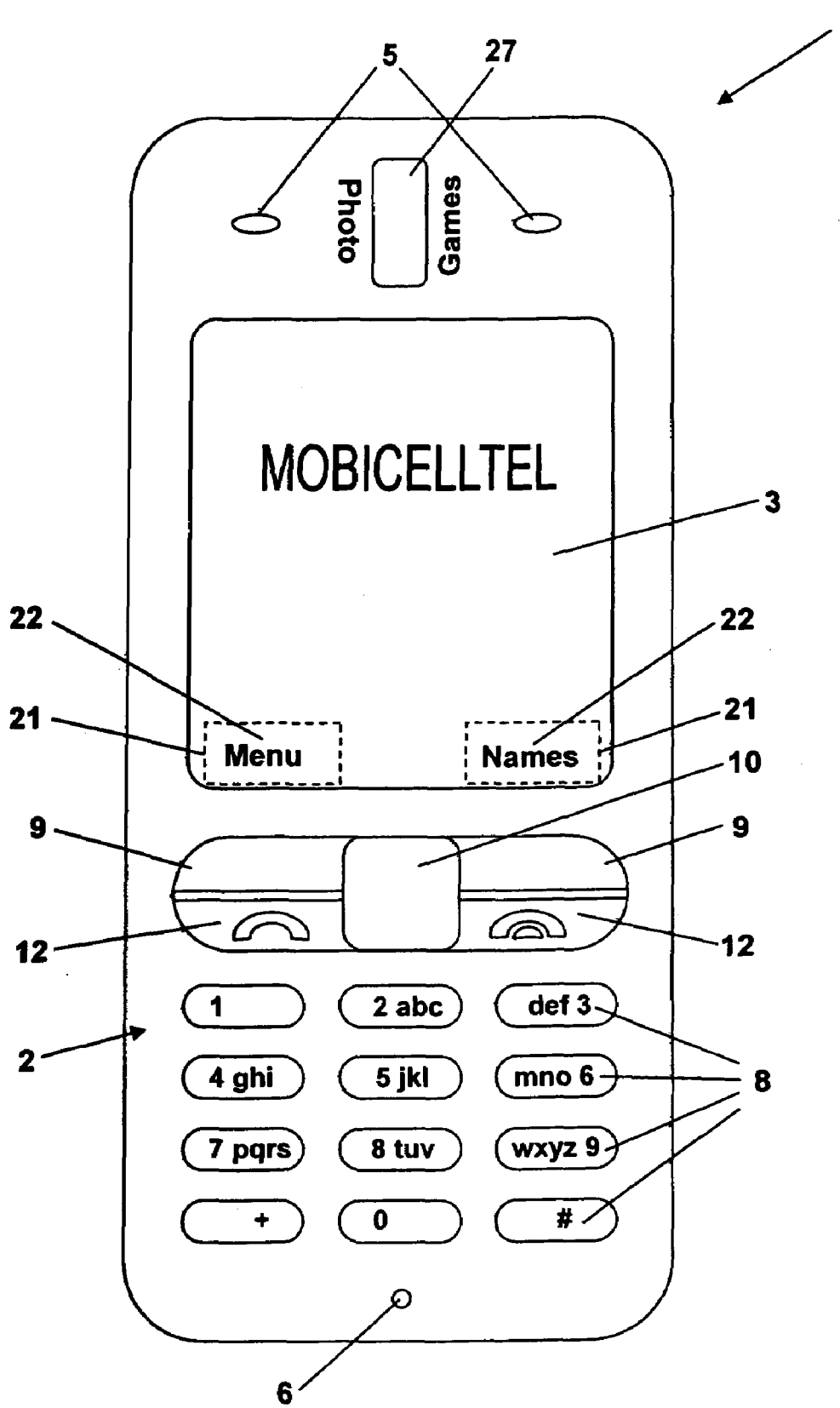
FIG. 15 illustrates a variation of the sixth embodiment.

FIG. 15 shows a variation of the phone of FIG. 14. The hard labels are in this variation printed next to the key 27. In both variations of this embodiment the labels can be provided with back lighting that can be alternatively activated, thus indicating to the user which of the functions is presently active.

Figure 16:
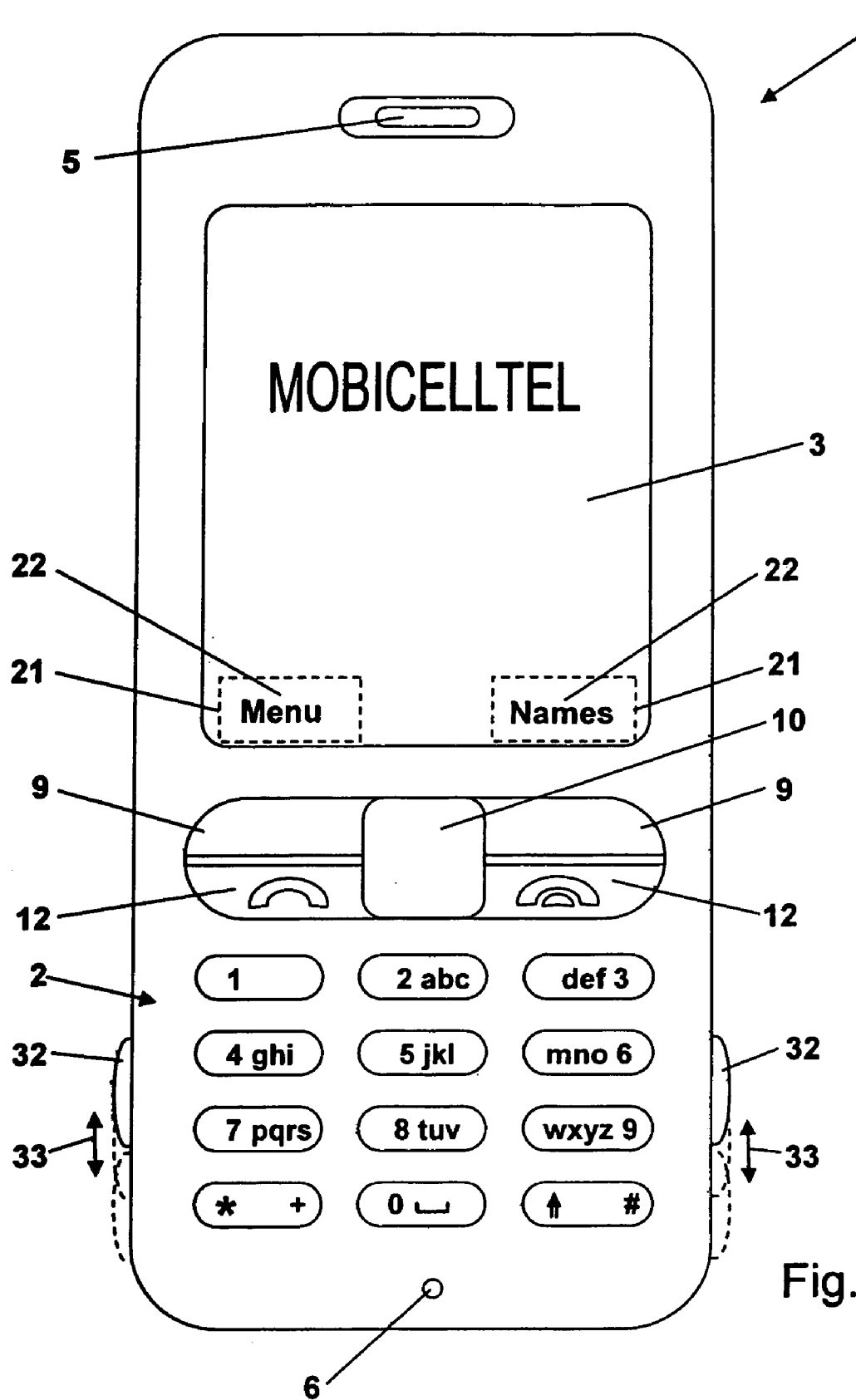
FIG. 16 illustrates a seventh embodiment of the present invention in a first orientation with a first set of labels being visible.
Figure 17:
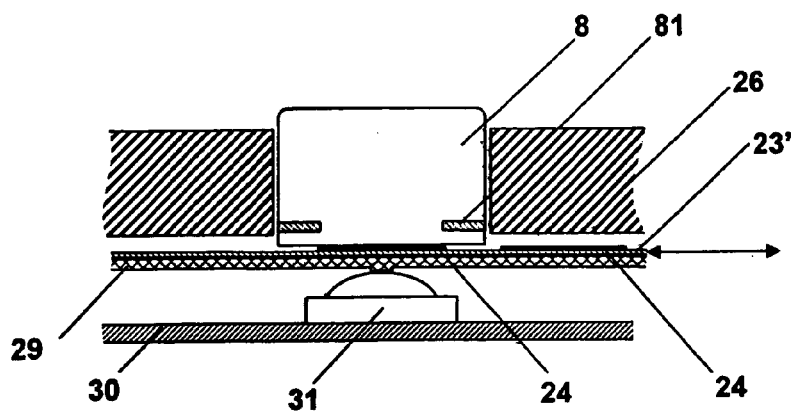
FIG. 17 illustrates in detail a second arrangement to change visible label groups.
Figure 18:
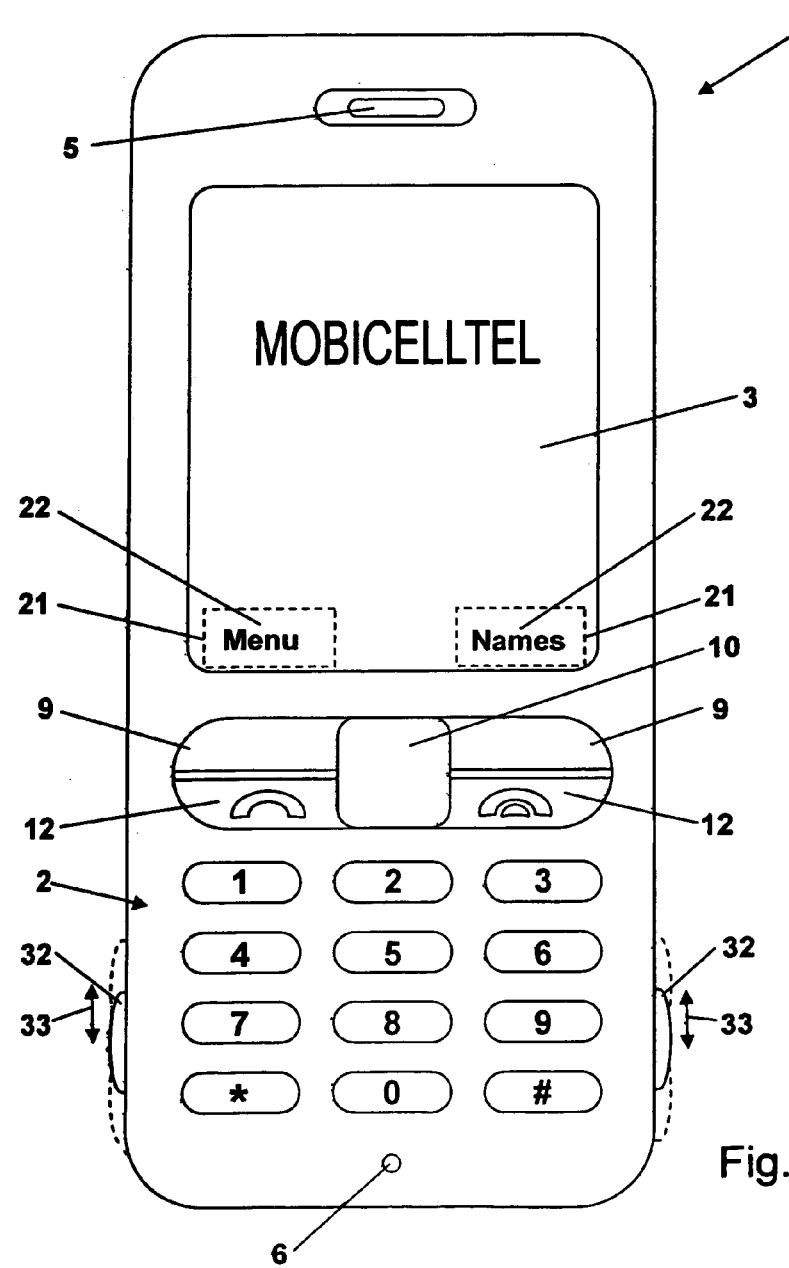
FIG. 18 illustrates the mobile terminal of FIG. 17 with a second label group being visible.
Figure 19:
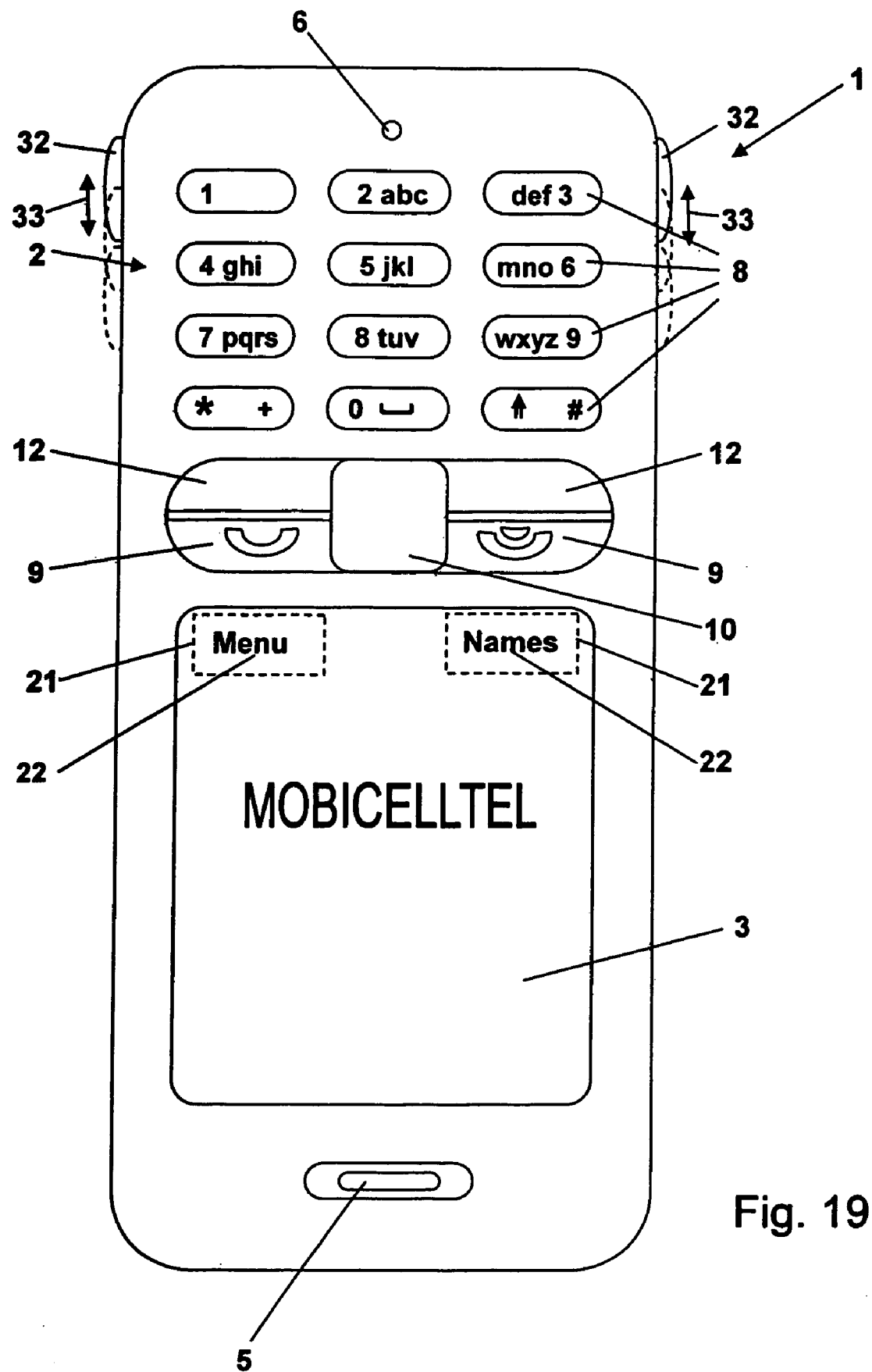
FIG. 19 illustrates the mobile terminal of FIG. 17 with in and upside down orientation with a third label group is visible.

FIG. 16 illustrates a fifth preferred embodiment the mobile communication terminal 1 according to the invention in the form of a mobile phone. The mobile phone, shown in the standard upright orientation, is similar to mobile phone described with reference to FIGS. 9 and 10, however, the keys 8 are transparent and the labels there behind are arranged on a slidable substrate 23' as shown in more detail in FIG. 17, the keys 8 are made of a transparent material and can be provided with view limiting blinds 81. The slidable substrate 23' is formed by a film on which the labels 24 are printed. The labels are arranged in a rectangular pattern that matches the pattern of the layout of the keys 8. The slidable substrate 23' is provided with three sets of labels 24, each set being visible in a different position of the slidable substrate 23'. The slidable substrate 23' can be slid in the direction of arrows 33 by means of a handle 32 in three positions as illustrated by FIGS. 18 and 19. A flexible intermediate layer 29 is arranged below the slidable substrate 23'. Dome switches 31 below the keys 8 are actuated through the slidable substrate 23' and the intermediate layer 29.

In FIG. 16, the slidable substrate 23' is in the upper position and a set of labels with the alphanumerical functions for the keys 8 is visible.

FIG. 18 illustrates the mobile phone in the upright position and the slidable substrate 23' in the middle position with a second set of labels visible. The second set of labels is numerical only and in a larger font for ease of reading, in particular for visually impaired users.

The mobile phone comprises the same tilt sensor 20 as in the previous embodiments. The processor unit 18 changes the orientation of the softkey labels to match the presently detected orientation of the phone.

FIG. 19 illustrates the mobile phone in the upside down orientation with the softkey labels 22 and the labels 24 keys perfectly readable to the user. The slidable substrate 23' is moved to the lower position and shows now a set of labels wherein the numbers and letters can be read in the upside down orientation of the phone. The processor unit 18 may—as shown—also change the orientation of the information displayed in the main area of the display 3. The position of the separate fields 21 is though not changed so that they remain proximate to the softkeys 9.

The slidable substrate 23' may be provided with more than only two—or more than three—label sets. The different label sets may relate to a different functionality of the keys, or to a different orientation of the label content.

Figure 20:
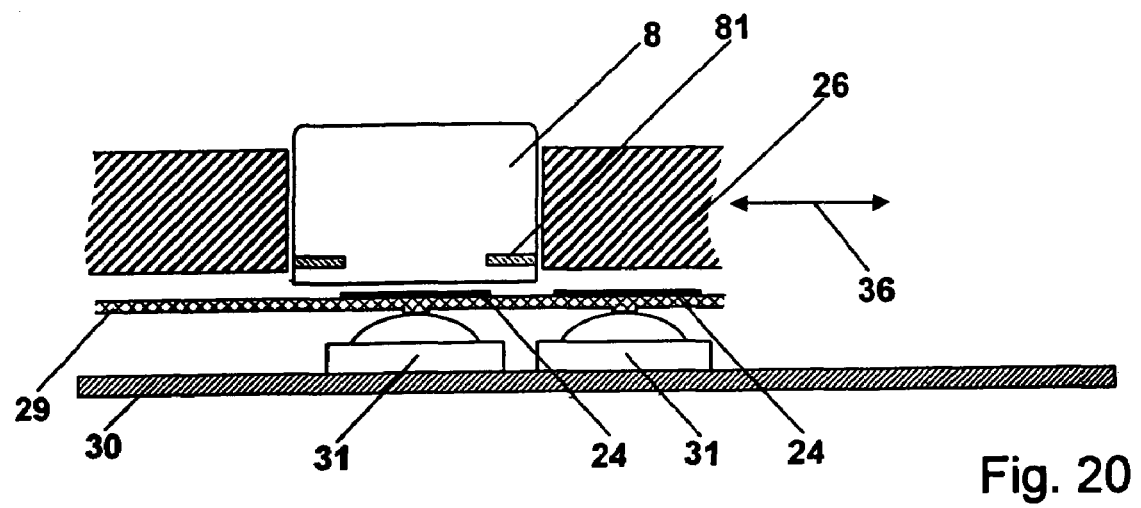
FIG. 20 illustrates in detail a third arrangement to change visible label sections.

FIG. 20 illustrates a third embodiment for rendering different labels visible under the keys 8. In this embodiment the label sets are arranged directly on the flexible intermediate layer 29. The keys 8 are fitted in a slidable keypad section 26. The slidable keypad section 26 can be slid in the direction of arrow 36 to move the keys 8 above a different label. Below each label 24 a dome switch 31 is arranged on the PCB 30.

Figure 21:
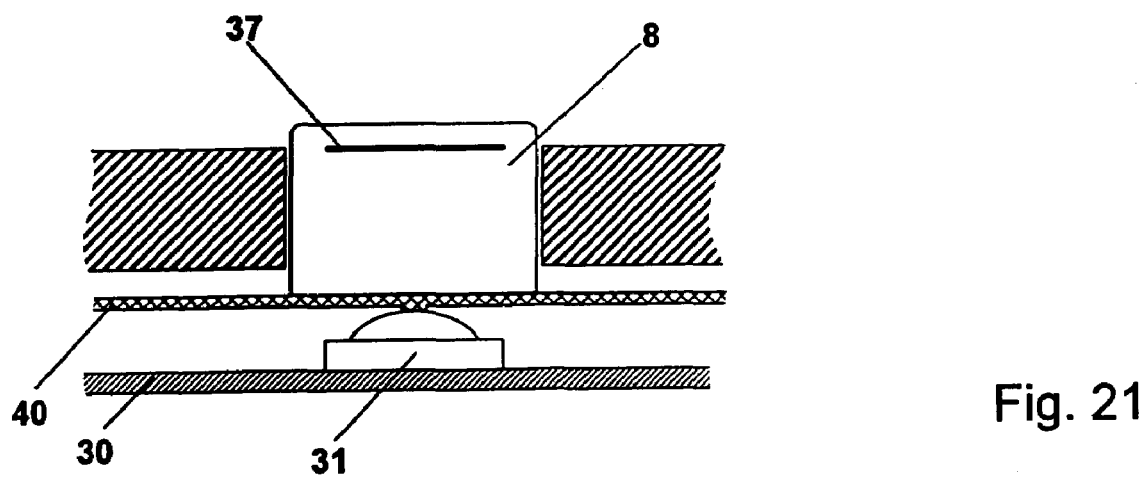
FIG. 21 illustrates in detail a fourth arrangement to change visible label sections.

FIG. 21 illustrates a fourth embodiment for rendering labels readable in different orientations. In this embodiment, the key is provided with a holographic label 37 that is preferably molded into the plastic key. The holographic label 37 can be read in at least two directions. The label content may be identical for each orientation, or different functions can be used in different orientations. The key 8 with the holographic label 37 is arranged in a conventional manner above a dome switch 31 on the PCB 30. A plurality of adjacent keys 8 may be interconnected by attaching them to a flexible keymat 40 that facilitates ease of insertion upon assembly. This type of arrangement can be used in combination with any of the previously described embodiments.

The hologram may be created by any commercially available holographic technology, such as
- diffractive optically variable image device (DOVID) using an array of tiny diffractive pixels,
- embossed, by embossing the impression of the hologram into the substrate material,
- photopolymer, using a photosensitive medium used for display holograms, usually on a polyester film substrate.

Figure 22:
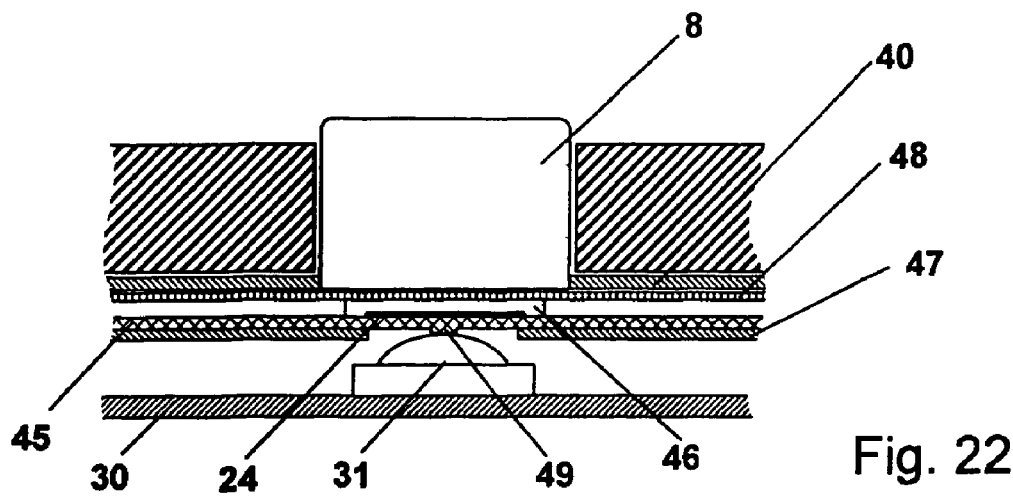
FIGS. 22 to 24 illustrate details of an arrangement to change label orientation.
Figure 23:
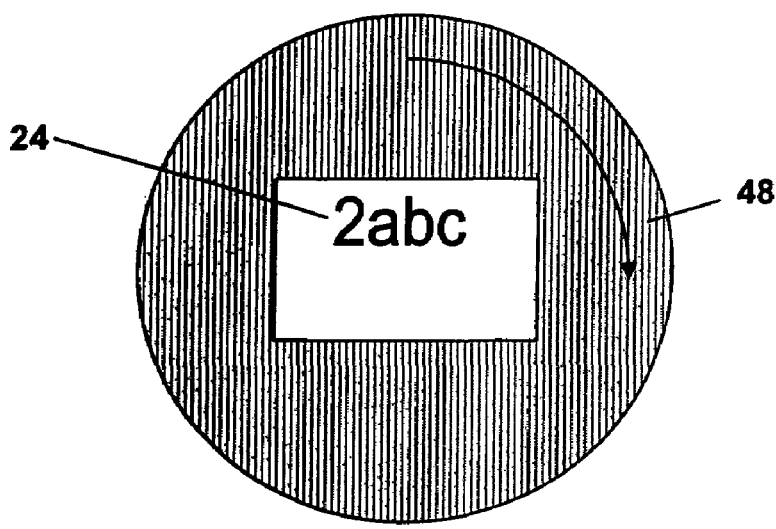
Figure 24:
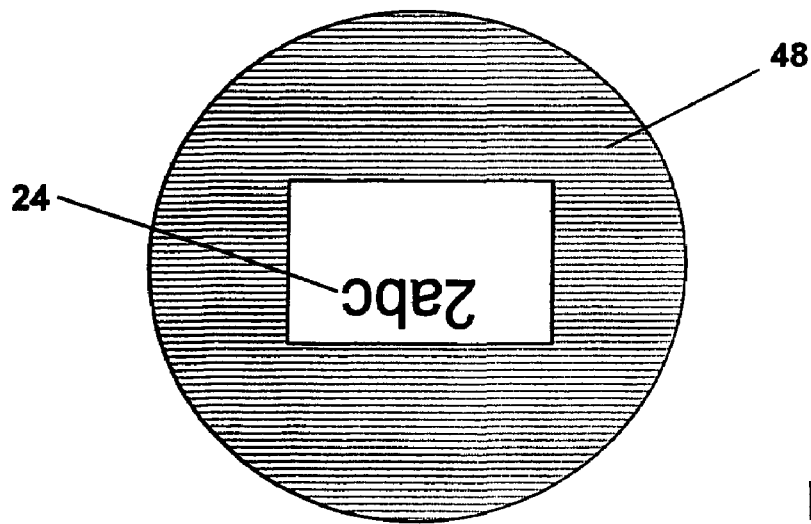

FIGS. 22 to 24 illustrate an arrangement to change label orientation using polarized films. The key 8 is attached to a flexible keymat 40 that interconnects a plurality of keys 8. A film 48 with polarized areas is arranged below the keymat 40. Different areas can have different polarization orientations. A preferably white film 45 is arranged below film 48. Black and white or color key labels 24 are printed on the white film 45 below the keys 8. The printed areas are covered by polarized film sections 46. The polarized film sections 46 are divided in sub-sections with differently polarized areas and non-polarized areas. A light guide layer 47 provides for backlighting. A dome switch 31 on the PCB 30 is arranged under a protrusion 49 on the bottom side of the white film 45.

The film 48 is movable by sliding and/or rotation. When the film 48 is moved relative to the film sections 46 different areas of the printed label 24 become visible, depending on the arrangement of the polarized areas and on the layout of the printed label 24.

FIGS. 23 and 24 show how an upright part of label 24 and upside down part of label 24 become alternatingly visible by rotating the film 48. In this example the upper part of the film section 46 is polarized in a first direction with an upright print part of label 24 there under. The lower part of film section 46 is polarized in a second direction with an upside down part of printed label 24 there under. In a first position of the film 48 (FIG. 23) the upright part of the alphanumerical label 24 of key 8 is visible. When the film 48 is turned 90° (FIG. 24) the label 24 changes, and is in this example upside down part becomes visible, thus facilitating the use of a terminal in which the key is used in an upside down orientation. The rotation of the film 48 may be effected by a handle driven mechanism (not shown) or any other conventional means to rotate a disk. The same effect could also be obtained by a slightly different arrangement of the polarized areas and by sliding the film 48 up and down or any other direction. This type of arrangement can be used in combination with any of the previously described embodiments.

Figure 25:
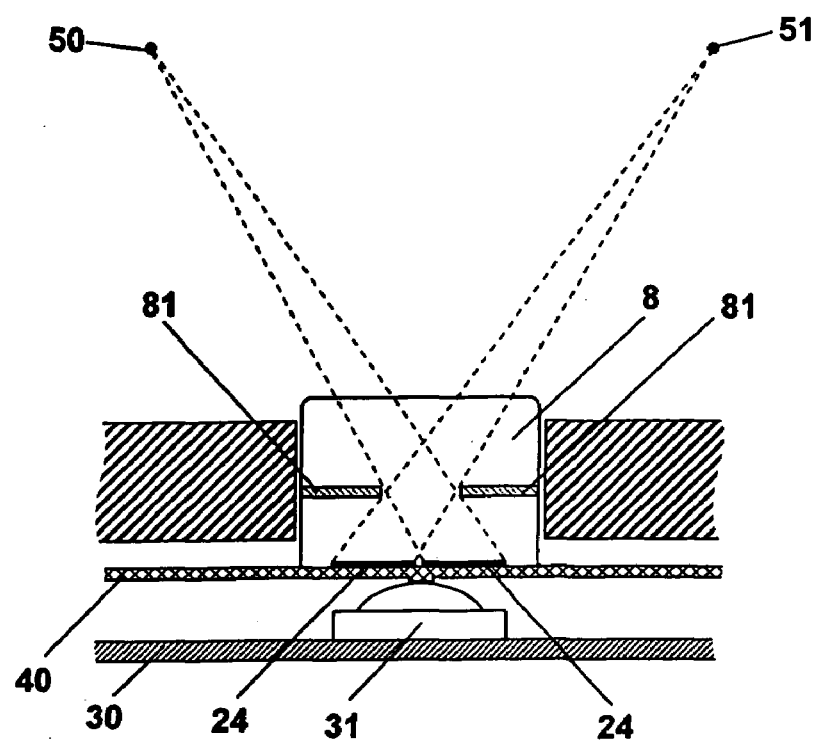
FIG. 25 illustrates in detail a fifth arrangement to change visible label sections.

FIG. 25 illustrates a fifth arrangement to change visible label sections. The transparent key 8 is provided with a blind 81. The opening in the blind, and the height relative to the labels 24 under the key 8 is such that there is a keyhole effect. Two labels 24 are arranged on a keymat 40, each label 24 being offset form the center of the key 8. A dome switch 31 on the PCB 30 and below the flexible substrate 29 is arranged right under the key 8. One of the labels 24 is completely visible from viewpoint 50. The other label 24 is completely visible from viewpoint 51, as indicted by the interrupted lines. Since the users usually hold a mobile terminal with the top tilted away from themselves, only one of the labels will be completely visible to the user. The content of the upper label 24 is in the upright orientation and will be seen when the terminal is held in the upright position with the top of the terminal titled slightly away from the user. The content of the lower label 24 is in the upside down orientation and will be seen when the terminal is held in the upside down position with the "top" of the terminal titled slightly away from the user. The same arrangement could of course also be created when the terminal is in the two different sideways orientations. This type of arrangement can be used in combination with any of the previously described embodiments.

Figure 26:
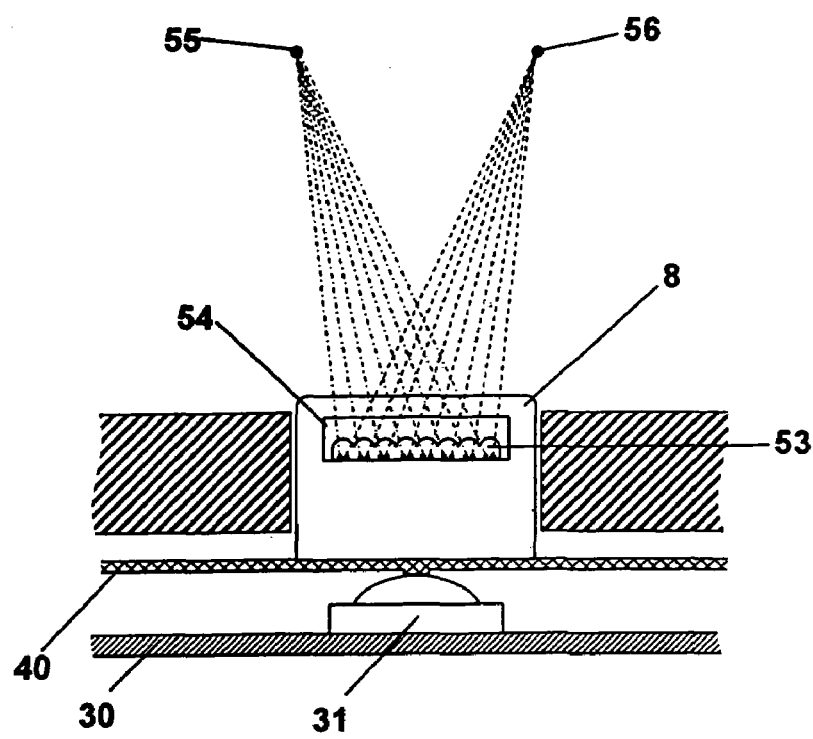
FIG. 26 illustrates in detail a sixth arrangement to change visible label sections.

FIG. 26 illustrates a sixth arrangement to change visible label sections. A lenticular screen 53 with two interlaced label images printed directly on the back of the plastic lenticular screen is placed at the bottom of a cavity 54 in the key 8. One of the label images is visible from viewpoint 55, the other from viewpoint 56.

The two images relate preferably to the same content in opposite orientations, e.g. upright and upside down. A plurality of adjacent keys 8 may be interconnected by attaching them to a flexible keymat 40 that facilitates ease of insertion upon assembly. Below the key 8 a dome switch 31 is arranged on the PCB 30. This type of arrangement can be used in combination with any of the previously described embodiments.

Although the present invention has been described in detail for purpose of illustration, it is understood that such detail is solely for that purpose, and variations can be made therein by those skilled in the art without departing from the scope of the invention.

Thus, while the preferred embodiments of the devices and methods have been described in reference to the environment in which they were developed, they are merely illustrative of the principles of the inventions. Other embodiments and configurations may be devised without departing from the scope of the appended claims.

What is claimed is:

1. A mobile communication terminal having a user interface comprising:
    a display for showing information,
    a keypad including a plurality of hard keys,
    at least one of the hard keys being formed by at least a partially transparent key body that allows objects under the key to be seen through the top of the key,
    a pair of polarized films mounted, one over the other, for movement relative to one another under the keypad,
    labels disposed beneath the polarized films for viewing through the polarized films, said labels including textual and or graphical content relating to the function of the hard key through which said label is viewed,
    whereby the textual and/or graphical content of the label can be read in at least two different orientations depending on the relative orientation of the polarized films to one another.

2. A mobile communication terminal having a user interface comprising:
    a display,
    a keypad having a function confirming key and a function rejection key and a plurality of hard keys, the plurality of hard keys preferably includes a
    group of alphanumerical keys and/or one or more navigation keys and
    wherein at least one of the hard keys is provided with a hard label that can be read in at least two different orientations,
    a function to be confirmed or to be rejected being controlled by a controller unit and being displayed in a predetermined area of said display, and
    an orientation sensor within the mobile terminal adapted to signal the controller unit to change the orientation in which the function is displayed when the orientation of the mobile communication terminal is changed; and
    wherein the orientation of hard label is changed by rotating a polarized film relative to another polarized film.

3. A terminal according to claim 2, wherein the controller unit changes the orientation of the soft label without changing the position of the predetermined area relative to the at least one softkey.

4. A terminal according to claim 2, wherein the controller unit changes the orientation of the soft label in response to a state change of the terminal or a upon a user entered command.

5. A terminal according to claim 2, wherein the controller unit changes the orientation of the soft label in response to a signal from an orientation sensor in the terminal.

6. A terminal according to claim 2, wherein the controller unit applies the same orientation changes to information on the display as to the soft label.

7. A terminal according to claim 2, wherein the soft label includes textual content.

8. A terminal according to claim 2, wherein the soft label includes graphical content.

9. A terminal according to claim 2, wherein the controller unit changes the orientation of the function to be confirmed or to be rejected without changing the position of the predetermined area relative to the confirming key and rejection key.

10. A terminal according to claim 2, wherein the controller unit changes the orientation of the function to be confirmed or to be rejected in response to a state change of the terminal or upon a user entered command.

11. A terminal according to claim 2, wherein the controller unit changes the orientation of the function to be confirmed or to be rejected in response to a signal from an orientation sensor in the terminal or in response to a manually activated switch.

12. A terminal according to claim 2, wherein the controller unit applies the same orientation changes to information on the display as to the function to be confirmed or to be rejected.

13. A terminal according to claim 2, wherein the function to be confirmed or to be rejected is represented by textual content.

14. A terminal according to claim 2, wherein the function to be confirmed or to be rejected is represented by graphical content.

15. A terminal according to claim 2, wherein the hard label is formed by a hologram.

* * * * *